April 27, 1926.
O. A. ANDERSON
MOTOR VEHICLE LOCK
Filed June 2, 1921
1,582,236
2 Sheets-Sheet 1
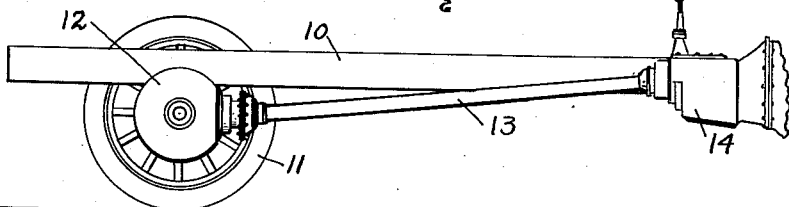
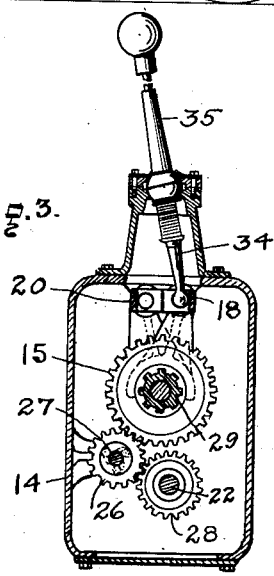
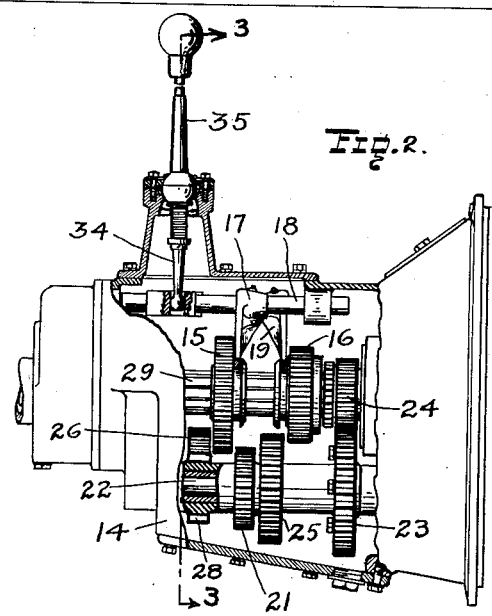
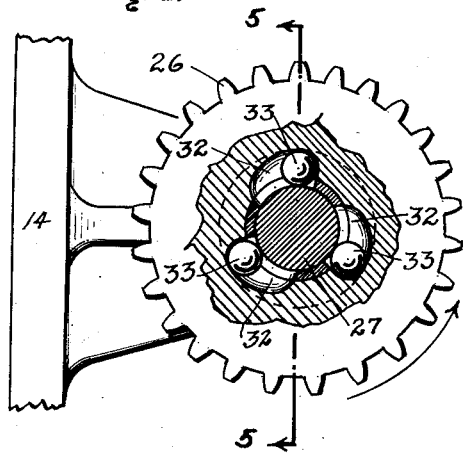
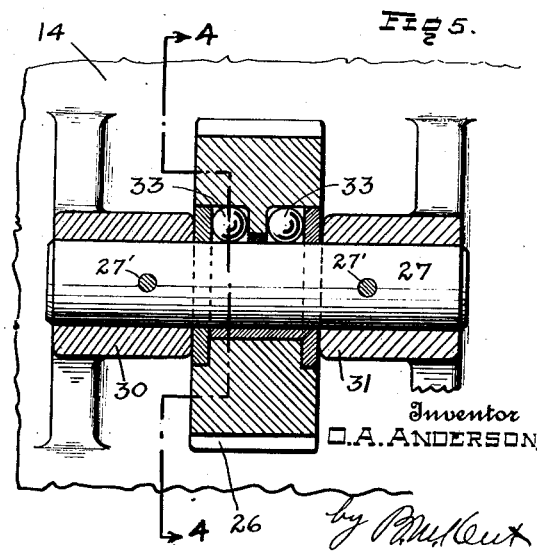
Inventor
O. A. ANDERSON
Attorney

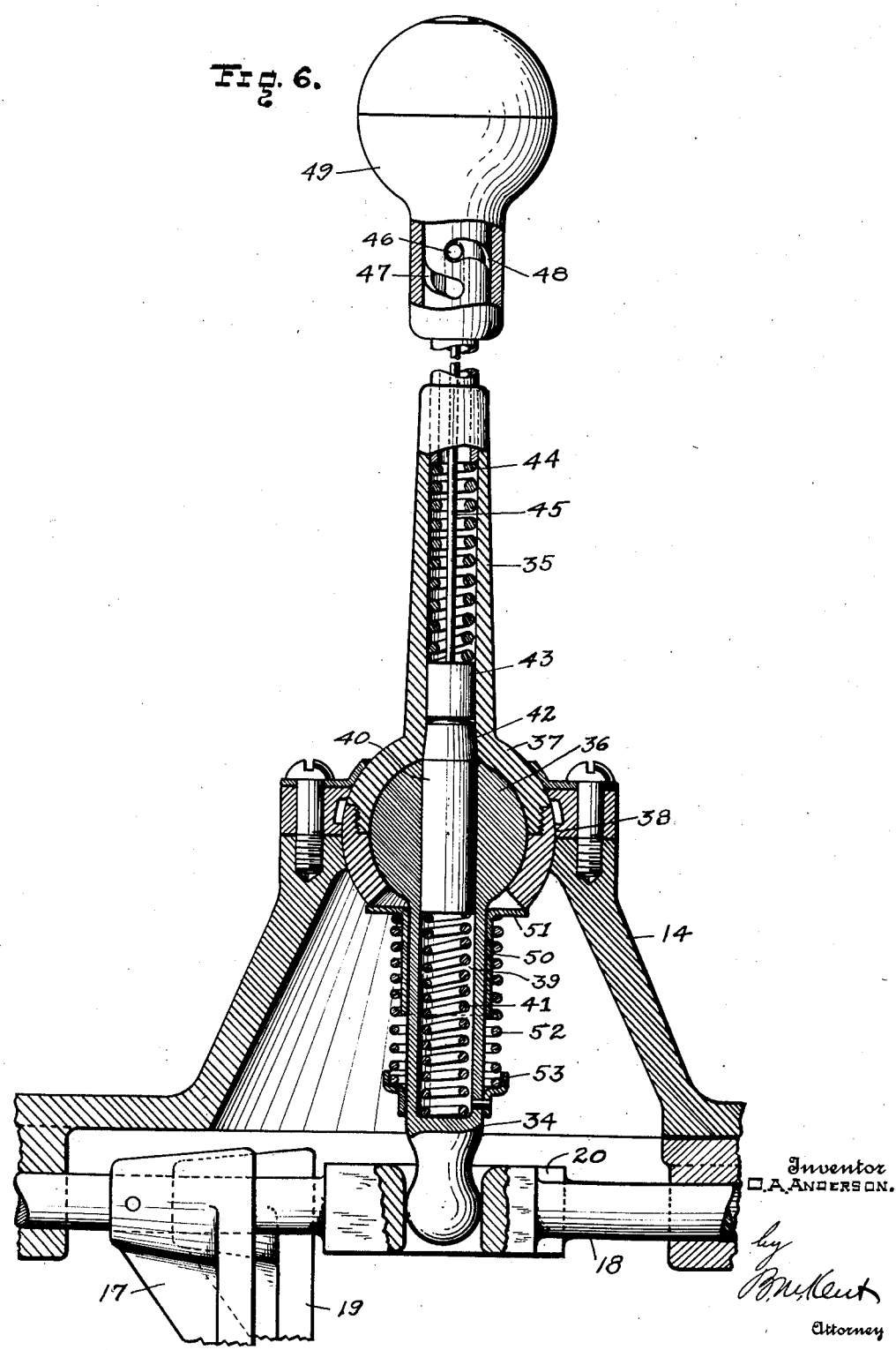

Patented Apr. 27, 1926.

1,582,236

UNITED STATES PATENT OFFICE.

OLAF A. ANDERSON, OF HAMILTON, OHIO.

MOTOR-VEHICLE LOCK.

REISSUED

Application filed June 2, 1921. Serial No. 474,510.

*To all whom it may concern:*

Be it known that I, OLAF A. ANDERSON, a citizen of the United States, and a resident of Hamilton, county of Butler, State of Ohio, have invented certain new and useful Improvements in Motor-Vehicle Locks, of which the following is a specification.

This invention relates to locking devices for motor vehicles and more particularly to means for locking the transmission mechanism.

It is one of the objects of the invention to provide a locking device which will prevent the vehicle from being driven or towed in the forward direction although permitting the vehicle to be driven or towed in the backward direction. In this connection it is plannd that the invention shall meet the condition that the vehicle must not be locked when standing at the curb of a street so that it cannot be moved in case of an emergency such as fire. It is also contemplated to meet the condition that any locking device which merely prevents driving the vehicle by its own motor is not sufficient proof against theft by towing the vehicle away. In providing a locking mechanism which prevents all but backward movement of the vehicle the above conditions have been met for it will then be possible to move the vehicle in case of an emergency and, since the vehicle could not be towed in the forward direction, it would be practically thief-proof because any attempt to tow a vehicle or drive it by its own motor in the backward direction for any distance would immediately arouse the suspicion of traffic officers and others who might witness the attempt. While a vehicle being towed in a forward direction would not necessarily arouse any suspicion of theft, yet the towing of a vehicle backward would immediately arouse such suspicion, particularly when it is known that vehicles are locked against all but backward movement.

My invention has the further advantage that it will prevent backward rotation of the engine when starting and hence save the so-called Bendix starting gear from the destructive effects that are sometimes occasioned by back-firing in starting the motor of the vehicle.

A further advantage of my invention lies in the fact that it automatically acts at all times to prevent backward movement of the vehicle when the gearing is set for forward movement. This is a safety that would prevent backward movement down a hill in case the vehicle engine stalled while the vehicle was going up the hill. My invention is, therefore, in its broadest aspect, a device automatically operating to prevent movement of the vehicle in a direction that is the reverse of that for which the gearing is set.

Another object of the invention is to provide an improved form of gear shift lever which, in combination with the other features of the invention, will accomplish the results above set forth.

In nearly all motor vehicles being built today a propeller shaft and change gearing are provided for transmitting the power from the engine to the driving axle and in nearly all vehicles, except those that sell at the very lowest price, a so-called sliding-gear transmission is employed which embodies an idler gear for driving the vehicle backward, and this idler gear is so arranged that in all normal positions of the mechanism it runs in the same direction. Specifically, my invention consists in the provision of means for preventing reverse rotation of this idler gear when the mechanism is locked in position to permit the vehicle to be driven backwards.

I have illustrated one embodiment of the invention in the accompanying drawings, of which:

Figure 1 is a somewhat diagrammatic elevation of the rear portion of a motor vehicle;

Fig. 2 is an enlarged view of the sliding-gear transmission mechanism with certain parts broken away to better illustrate the invention;

Fig. 3 is a transverse section of the transmission gearing on the line 3—3 of Fig. 2;

Fig. 4 is a side elevation of the reverse idler gear with parts broken away to show the means for preventing backward rotation thereof;

Fig. 5 is an axial section thru the idler gear and its mounting, taken on the line 5—5 of Fig. 4; and Fig. 6 is an enlarged axial section of a gear shift lever embodying certain of the features of the invention, certain parts of the view being shown in side elevation.

Referring to the drawings, 10 indicates the frame of the vehicle, 11 one of the driving wheels, 12 the rear axle, 13 the propeller shaft and 14 the casing in which the transmission gearing is housed. While the invention is not limited to any particular form of transmission gearing, I have illustrated it in connection with that type of transmission gearing which is adapted for driving the vehicle at three different forward speeds and one reverse speed. In this mechanism there are two sliding-gears, 15 and 16, one of which is actuated by an arm 17 on the sliding rod 18 and the other of which is actuated by an arm 19 on the sliding rod 20. The gear 15 is adapted to be moved into mesh with the gear 21 on the countershaft 22, the gear 21 being rigidly connected with a gear 23 so as to rotate with the latter which is, in turn, rotated by a gear 24, driven by the motor of the vehicle, in the usual manner. The gear 16 is adapted to slide into mesh with the gear 25 which is also rigidly connected with the gear 23, or to be interlocked with the gear 24 in the well known manner, so as to be driven directly by the latter.

The gear 15 is also adapted to be moved into mesh with the idler gear 26, on the shaft 27, which is constantly rotated by the gear 28 which is also rigidly connected with the gear 23. The gear 23, being constantly rotated in the same direction by the motor of the vehicle, the gear 26 will be likewise constantly rotated by the motor and this direction of rotation is indicated by the arrow on Fig. 4. When the gear 15 is in mesh with the gear 21 or the gear 16 is in mesh with the gear 25 or interlocked with the gear 24, the shaft 29, which is connected with the propeller shaft 13, will be rotated in one direction, whereas when the gear 15 is in mesh with the idler gear 26, the shaft 29 will be rotated in the reverse direction and this is the arrangement for propelling the vehicle backwards.

While the gear 26 is rotated by the motor only in one direction, if the gear 15 is in mesh therewith and the vehicle is moved in the forward direction, the direction of rotation of the gear 26 would be reversed and, therefore, by providing means for automatically preventing such reverse rotation of the gear 26 I am able to prevent the vehicle from being moved in the forward direction.

Referring to Figs. 4 and 5 it will be observed that the shaft 27 is supported in the brackets 30 and 31 on the casing 14 and prevented from rotation by the pins 27′, and that the idler gear 26 is arranged between the brackets 30 and 31. The gear 26, in the form of the invention illustrated, is provided with the pockets 32 for balls 33 which constitute an ordinary ball ratchet which permits rotation of the gear 26 in the direction of the arrow on Fig. 4 but prevents reverse rotation. Other forms of ratchet devices for preventing backward rotation of the gear 26 may be provided and it will be understood that the ball ratchet device shown in Figs. 4 and 5 is merely for the purpose of illustrating the principles of my invention without the intention on my part to limit the scope of the patent to this particular type of ratchet device.

In view of the fact that the idler 26 is constantly rotated by the motor and is prevented from backward rotation it will have the effect of preventing backward rotation of the motor of the vehicle and thereby eliminate the troubles that have resulted in the usual Bendix starting gear of the motor by back-firing and a sudden reversal of the direction of rotation of the motor.

In case the motor of the vehicle should stall while driving the vehicle up grade, any backward movement of the vehicle would reverse the idler 26 and lock it to the shaft 27 which would instantly stop the backward movement of the vehicle and thus act as a safety device.

While the prevention of backward rotation of the gear 26 will effectively prevent a vehicle from being moved in the forward direction, yet, in order to render the vehicle thief-proof, it is necessary to provide means for locking the transmission gearing with the gear 15 in mesh with the gear 26. This I accomplish by means of a gear shift lever such as illustrated in Fig. 6 although I may use, in place of the lever illustrated in Fig. 6, one of the forms of lever illustrated in my co-pending application No. 464,121, filed April 25, 1921. In the lever illustrated in Fig. 6, as well as in the forms illustrated in my said co-pending application, there are two sections which in Fig. 6 are represented by the parts 34 and 35, the part 34 having a ball end 36 which is received in the socket 37 of the section 35. The section 34 is adapted to be operatively connected with the rods 18 and 20 in the usual manner, for the purpose of shifting the gears 15 and 16. The end 37 of the section 35 has a spherical exterior which is mounted in the spherical seat 38 of the gear casing 14 so that the section 35 is adapted for universal movement in this seat. Likewise the ball and socket connection between the sections 34 and 35 permits relative universal movement of these sections when they are not locked together as will be now described.

The section 34 is provided with an axial bore 39 in which there is arranged a pin or tumbler 40 and a spring 41 which, as will be readily understood from the drawing, presses the pin 40 upwardly and holds it in the opening 42 therefor in the section 35. When the pin 40 is in the position shown in Fig. 6 the sections 34 and 35 are rigidly secured together so that they move as a unit but when the pin 40 is pushed down out of engagement with the section 35, the latter may be freely moved without moving the section 34. For the purpose of disconnecting the pin 40 from the section 35 I have provided a plunger 43 which is normally pressed downwardly against the pin 40 by the spring 44 which should be considerably stronger than the spring 41 so as to overcome the latter when it is desired to force the pin 40 out of engagement with the section 35. A rod 45 is connected with the plunger 43 and carries at its upper end a transversely extending pin 46, the ends of which are arranged in the spiral slots 47 and 48 on the interior of the rotatable knob 49, in the same manner as in the constructions illustrated in my aforesaid co-pending application. By rotating the knob 49 it is possible to raise and lower the plunger 43 and thereby either force the pin 40 out of engagement with the section 35 or permit the pin to enter the opening 42 therefor when the sections are in proper alignment. The knob 49 should be provided with means for locking it against rotation when the pin 40 is disconnected from the section 35, thereby making it impossible to actuate the section 34 and shift the gears 15 and 16. The means for locking the knob 49 are fully described and claimed in my aforesaid co-pending application and it is, therefore, deemed unnecessary to enter into a detailed description of this feature of the device in this application. It will also be understood that any means for locking the knob 49 with the sections 34 and 35 of the lever disconnected, would accomplish the purpose although I prefer the form of locking device described in my aforesaid co-pending application.

In using the invention when it is desired to lock the vehicle the gear 15 will be shifted into mesh with the gear 26 and then the knob 49 actuated to disconnect the sections 34 and 35 of the lever and then locked. This will set the mechanism so that the gear 15 cannot be shifted out of mesh with the gear 26 and therefore prevent the vehicle from being driven in the forward direction.

For the purpose of holding the sections 34 and 35 of the lever, in their normal, connected relation, I provide a sleeve 50 on the exterior of the section 34 which will have its flange 51 pressed against the open end of the socket 37 by the spring 52, the lower end of which is carried by a collar 53 pinned to the section 34. This feature of the mechanism is also described and claimed in my aforesaid co-pending application.

Having thus described my invention, what I claim is:

1. In a motor vehicle, the combination with the driving wheels and transmission gears for rotating said wheels so as to propel the vehicle either forward or backward, said gears including one that rotates in the same direction whether the vehicle is propelled by said gearing either forward or backward, a non-rotatable shaft on which said gear rotates, and means for locking said gear to said shaft to automatically prevent reverse rotation thereof.

2. In a motor vehicle, the combination of a propeller shaft, a non-rotatable shaft, a reversing gear on said shaft rotatable by the vehicle motor in but one direction, a shiftable gear for operatively connecting said reversing gear with said propeller shaft, means for shifting said shiftable gear, means for rendering said shifting means inoperable when said shiftable gear is in mesh with said reversing gear, and means operable to lock said reversing gear to said non-rotatable shaft to automatically prevent backward rotation of said reversing gear when operatively connected with said propeller shaft.

In testimony whereof I affix my signature.

OLAF A. ANDERSON.